United States Patent [19]

Bien

[11] Patent Number: 4,688,960
[45] Date of Patent: Aug. 25, 1987

[54] SELF-CLINCHING PLATE FASTENING ARRANGEMENT

[75] Inventor: Alfred A. Bien, West Bloomfield, Mich.

[73] Assignee: Chrysler Motors Corporation, Highland Park, Mich.

[21] Appl. No.: 880,436

[22] Filed: Jun. 30, 1986

[51] Int. Cl.$^4$ ............................................. F16B 11/00
[52] U.S. Cl. .................................... 403/285; 403/375; 403/405.1; 29/520
[58] Field of Search ...................... 403/405.1, 199, 231, 403/242, 274, 279, 281, 329, 338, 353, 354, 375, 380, 393, 285; 29/520; 411/180

[56] References Cited

U.S. PATENT DOCUMENTS

| | | | |
|---|---|---|---|
| 1,872,385 | 8/1932 | Andren | 403/242 |
| 2,058,148 | 10/1936 | Hard | 403/375 X |
| 2,139,590 | 12/1938 | Jessop | 29/520 |
| 2,254,558 | 9/1941 | Williams | 403/274 |
| 2,660,130 | 11/1953 | Johnson | 403/376 |
| 2,727,220 | 12/1955 | Buchanan et al. | 403/373 |
| 3,430,385 | 3/1969 | Biro | 403/231 |
| 3,726,000 | 4/1973 | Hafner | 403/285 X |
| 3,858,988 | 1/1975 | Cohen | 403/329 |
| 3,970,400 | 7/1976 | Reid | 403/242 |
| 4,011,707 | 3/1977 | Nute, Jr. | 403/231 |

Primary Examiner—Cornelius J. Husar
Assistant Examiner—Peter M. Cuomo
Attorney, Agent, or Firm—Edward P. Barthel

[57] ABSTRACT

A fastening arrangement for first and second plate members whereby the plates are permanently interlocked in a flush manner. The first plate member has an open loop depending strap portion pierced therefrom adapted to be engaged in an elongated frusto-conical sectioned raised slot in the second plate member. The parts are of predetermined dimensional relationship such that upon upper and lower die members flattening the depending strap portion engaged in the raised elongated slot the plate members are permanently interlocked in a flush manner.

4 Claims, 6 Drawing Figures

U.S. Patent   Aug. 25, 1987   4,688,960
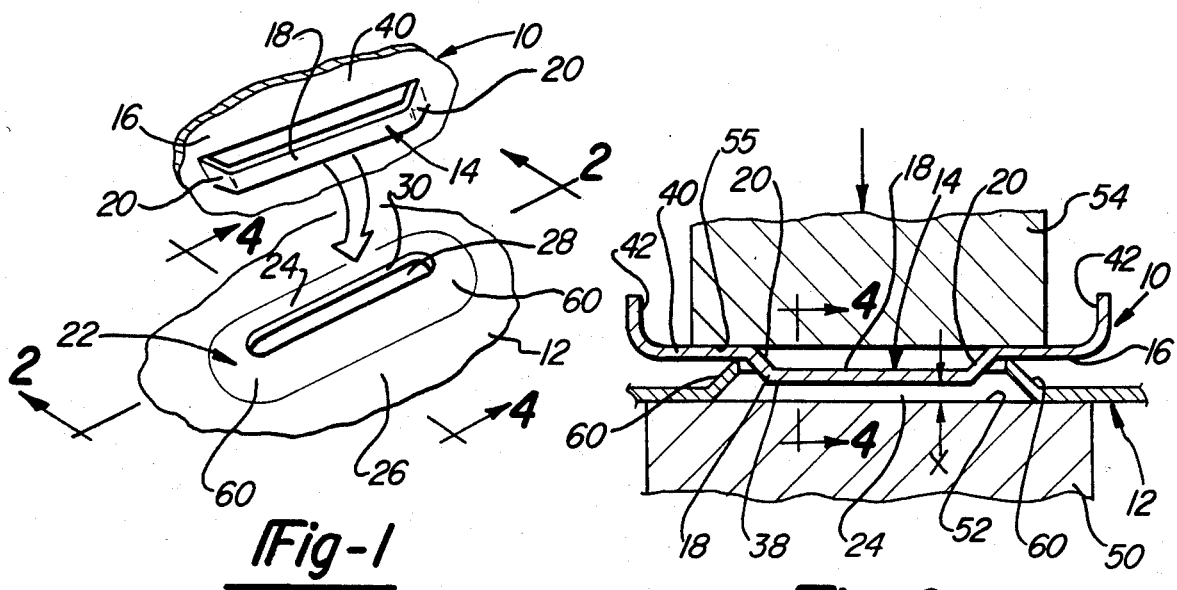
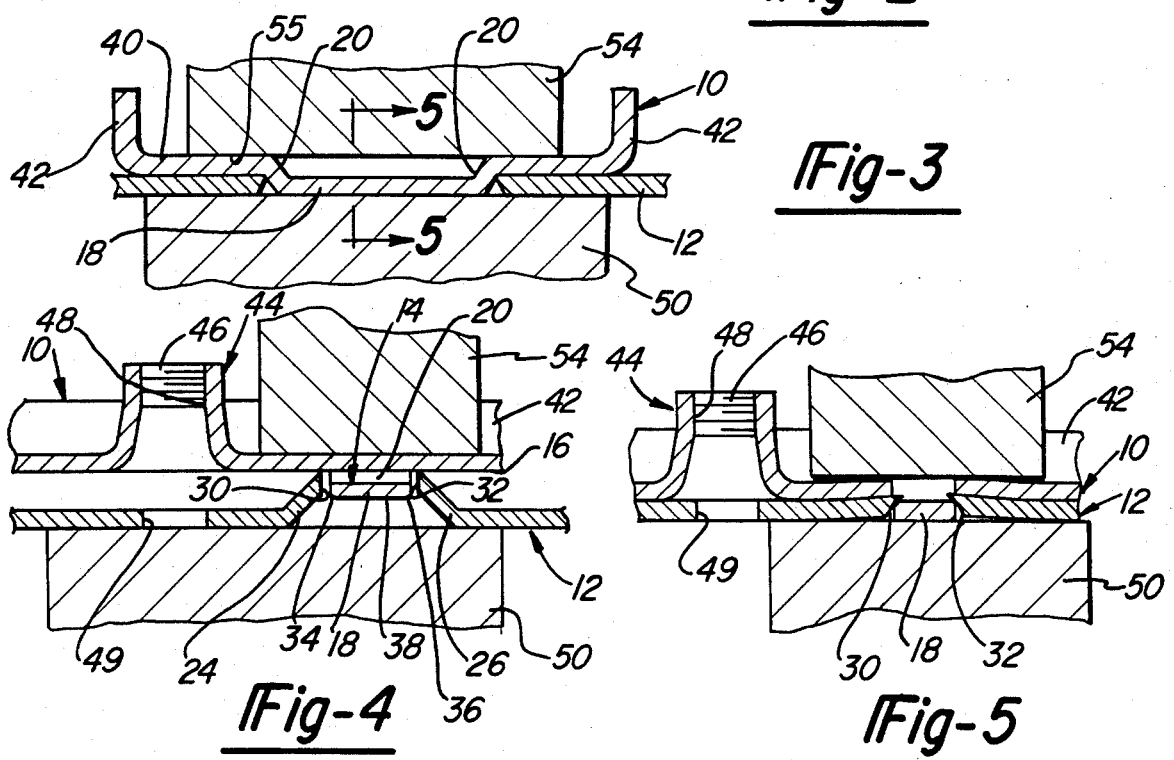
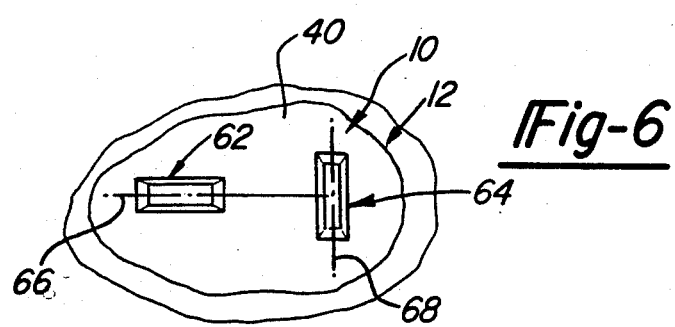

SELF-CLINCHING PLATE FASTENING ARRANGEMENT

BACKGROUND OF THE INVENTION

This invention relates generally to integral plate fastening arrangements and more particularly to a overlying plate having a depending fastening strap pierced therefrom engaged in an elongated frusto-conical sectioned raised slotted opening in a underlying plate. Upon upper and lower upsetting die members flattening the depending strap engaged in the slotted opening the plates are permanently interlocked in a flush manner.

Various forms of self-clinching arrangements have been used to secure a pair of first and second members. The U. S. Pat. No. 4,370,794 issued Feb. 1, 1983 to Bien et al disclose a clinch nut and method of installing same wherein the method includes punching a rectangular opening in a panel to receive the nut pilot and ramming the nut abutment portions against the panel to deform the panel beneath the inclined pilot side faces.

SUMMARY OF THE INVENTION

The present invention aims at providing a self-clinching fastening arrangement adapted for permanently interlocking plate-like panel members, formed from flat steel stock, in a flush manner. Accordingly, it is a first object of the invention to provide an improved arrangement for permanently interlocking a pair of sheet metal panels which is economical to manufacture allowing the panels to be self-clinched upon the panels being driven toward each other by a suitable fabrication tool An upper or first panel is formed with one or more depending open loop straps pierced or lanced therefrom by a punch or other suitable tool. A lower second panel is formed with one or more raised elongated impressions each defining an elongated frusto-conical sectioned slot. Each strap is sized to engage in an associated elongated slot such that the upper panel initially rests in spaced, substantially parallel, relation on the lower panel elongated raised impression. A die or other suitable movable fabrication tool is forced down after being brought to bear in a flush manner on the upper surface of the first panel against the resistance of an aligned back-up member such as an anvil, placed flush with the undersurface of the second panel. During fabrication the upper panel undersurface is rammed against the raised impression. This initially deforms the raised impression's continuous peripheral tongue portion laterally inwardly causing the tongue side edges to engage the adjacent edges of the strap. Upon the strap contacting the anvil the tongue side edges will be tightly anchored between the strap and the upper panel with the interlocked panel working surfaces substantially flush with their associated die and anvil surfaces.

When a pair of straps and their associated raised impressions are placed with their principal axes at right angles the first and second panels can be located in a more precise manner, if required. Also, by employing a pair of normally related fastening arrangements, the panels are capable of being interlocked in a single relative orientation thus insuring that the panels will not be incorrectly assembled in a reverse manner.

Other more specific objects and advantages of the invention will become apparent when reference is made to the following description and accompanying drawings.

BRIEF DESCRIPTION OF THE DRAWINGS

FIG. 1 is an exploded perspective view of the panel self-clinching fastening arrangement constructed in accordance with the teaching of this invention;

FIG. 2 is a cross-sectional view taken generally in the plane of line 2—2 of FIG. 1, illustrating the engaged panels prior to being interlocked;

FIG. 3 is a view similar to FIG. 2 illustrating the panels in their interlocked flush position;

FIG. 4 is a cross-sectional view taken generally in the plane of line 4—4 of FIG. 2;

FIG. 5 is a view similar to FIG. 4 illustrating the panels in their interlocked flush position; and FIG. 6 is a top plane view of upper and lower interlocked panels wherein a pair of self-clinching fastening arrangements are positioned normal to one another.

DETAILED DESCRIPTION OF THE INVENTION

Referring more specifically to the drawings, a sheet material fastening arrangement involving the principles of this invention is shown best in FIG. 1. The fastening arrangement is preferably constructed between upper 10 and lower 12 sheet material panel or plate members, which members are formed of any suitable flat steel stock material. The upper panel member 10 has an elongated open loop strap 14 lanced or pierced therefrom so as to depend a predetermined distance below its undersurface 16. The elongated strap comprises a planar base portion 18 integrally connected to the upper panel by a pair of downwardly tapered or angled ramp or wall portions 20 at each end so as to longitudinally face one another. The base portion 18 is oriented substantially parallel to the plane of the upper panel member 10.

The lower panel member 12 is shown as flat sheet steel stock formed with a raised elongated oval-shaped impression generally indicated at 22 in FIG. 1. The raised impression 22 is defined by a continuous peripheral tongue including pair of opposed spaced side tongue portions 24 and 26 disposed in upwardly inclined mirror image relation to each other. The tongue portions 24 and 26 define an elongated opening or slot 28 having a parallel sides 30 and 32. The slot 28 has a predetermined width greater than the width of strap 14 allowing the strap to be engaged received in the slot with a slight clearance on either side. As seen in FIG. 2 and 4 the upper panel member undersurface 16 contacts the tongue upper peripheral knife edge of the raised impression 22 wherein and that the panel members are substantially parallel.

As seen in FIGS. 2 and 4, the slot 28 is of sufficient length and width to engage the strap base portion 18 therein with slight clearance spaces provided therebetween. FIG. 4 shows the tongue side portions 24 and 26 formed with their parallel sides 30 and 32 disposed in vertical planes substantially parallel to their corresponding opposed base portion sides 34 and 36, respectively. It will be noted in FIG. 2 that the base portion 18 has its lower surface 38 disposed a predetermined distance below the tongue sides 30 and 32 for a reason to be explained.

In the disclosed embodiment the upper panel member 10 is shown in FIGS. 2 and 3 in the form of a U-shaped elongated channel-shaped clip-like member or element having a planar bottom portion 40 and a pair of upstanding side flanges 42. The channel member bottom portion 40 is shown in FIG. 4 having an integral securing means 44 in the form of an extruded threaded socket for a fastener member such as a threaded bolt (not shown). Such bolt is adapted to thread to internal threads 46 around the periphery of socket bore 48. Obviously, the fastener member bore 48 is required to be aligned with hole 49 in lower panel 12 for reception of the threaded bolt. The fastening arrangement of the present invention is particularly adapted to secure a clip-like element 10 at a mid-panel location of a sheet steel panel 12 that is not suitable for a welded connection.

In the apparatus shown in FIG. 2 during a stamping or flattening operation, a stationary lower die or anvil, partially shown at 50, is used to support the lower panel 12 in a flush manner on the anvils upper working face 52. With the upper panel member 10 positioned as shown a movable upsetting aligned die member, partially indicated at 54, has its working face bearing on the upper surface of the bottom portion 40. The upper die member 54 is forced or rammed down from its above initial FIG. 2 position to the position shown in FIGS. 3 and 5 wherein the upper member bottom portion 40 is in flush relation with the lower panel member 12.

More particularly, it will be noted that when the moving die 54 is forced down from its initial FIG. 4 position to its final FIG. 5 position, the strap base portion 18 will be forced downward a distance "X" prior to engaging the anvil working face 52. That is, the lower panel tongue side portions 24 and 26 will start to be flattened in advance of the upper panel strap 14. As a result the tongue side portions 24 and 26 shall be forced laterally inwardly causing the tongue sides 30, 32 to engage the upper edges of the strap sides 34 and 36 as seen in FIG. 5. It will be noted in FIG. 5 that the flattened tongue sides 30, 32 are symmetrically oriented in upwardly inclined mirror image relation at angles of about 60° to the horizontal engaging an associated upper side edge of the strap base portion 18. By virtue of this arrangement the upper panel member 10 is positively and permanently interlocked to the lower panel member 12.

It will be seen in FIG. 2 that the strap 14 has its ramp portions 20 juxtaposed relative to elongated impression 22 end portions 60. In this manner when the upper die 54 is forced down the juxtaposed tongue end portions are forced laterally inwardly at the juncture of the ramp portions with the upper panel member planar portion. This insures that the upper panel member socket bore 48 is accurately aligned with respect to the lower panel opening 49.

With reference to FIG. 6, there is shown a plan view of a modified construction in accordance with the present invention. In FIG. 6 a pair of securing arrangements are shown at 62 and 64 in normal relation locking the lower panel 12 to the upper member planar base portion 40 at two locations. It will be seen that the principal center line 66 of assembly 62 is positioned at right angles to the principal center line 68 of the assembly 64. By virtue of this arrangement, the upper panel 10 may only be interlocked at a single orientation relative to the panel 12. Thus, during assembly, the parts may not be inadvertently reversed by the installer. Further, the arrangement of FIG. 6 insures that the socket bore 48 will be accurately aligned with its associated lower panel hole 49.

Obviously, many modification and variations of the present invention are possible in light of the above teaching. It is therefore to be understood that within the scope of the appended claim, the invention may be practiced otherwise than is specifically described.

What is claimed is:

1. A self-clinching flush fastening arrangement of the permanently interlocked type comprising, first and second sheet metal panels wherein each panel defines an upper and a lower planar surface, said first panel having an elongated open loop strap portion pierced so as to initially depend from its lower surface, said strap portion defined by a pair of longitudinally facing walls tapered downwardly from said first panel upper surface to a planar base portion, said base portion having parallel sides defining longitudinally extending upper and lower edges, said second panel having an elongated oval-shaped impression raised from its upper surface, said impression formed with a continuous peripheral tongue including opposed spaced upwardly inclined mirror image side tongue portions, said tongue portions having opposed vertically disposed parallel side faces defining an elongated longitudinally extending slot therebetween, said slot sized to engage said strap portion therein such that with said first panel lower surface contacting said tongue portions along their upper edges said strap base portion located a predetermined distance from a plane that includes said second panel lower surface, such that each said strap base portion upper edge is positioned in intermediate opposed relation with its associated tongue portion side face, whereby upon said strap portion and said raised impression being flattened by ramming said first panel lower surface and second panel upper surface into flush abutment said raised impression side tongue portions when flattened decreasing the transverse dimension of said elongated slot such that each said tongue portion opposed side face slants inwardly in interlocking engagement with its associated strap base portion upper edge and said first panel lower surface thereby permanently interlocking said sheet metal element lower surfaces and aid lower panel upper surface in flush contact whereby said first panel upper surface and said second panel lower surface are uninterrupted by confining said displaced strap and tongue portions between parallel planes defined by said first panel upper surface and said second panel lower surface.

2. The fastening arrangement as set forth in claim 1, wherein said first panel having a pair of first and second elongated open loop strap portions pierced therefrom, said pair of strap portions spaced at a predetermined distance wherein the principal longitudinal axis of said first strap portion is oriented at right angles to the principal longitudinal axis of said second strap portion and said second panel having a pair of first and second impressions raised therefrom, said pair of raised impressions oriented in a predetermined manner such that said first raised impression defining an elongated slot sized to engage said first strap portion therein and said second raised impression defining an elongated slot sized to engage said second strap portion therein, whereby upon said pair of strap portions and their associated raised impressions being flattened, as described in claim 6, said first and second panels being permanently interlocked at a single determined orientation.

3. A self-clinching fastening arrangement of the permanently interlocked type comprising; a sheet metal element having upper and lower planar surfaces and a sheet metal support panel having upper and lower planar surfaces, said sheet metal element including an elongated open loop strap portion pierced therefrom initially depending from its lower surface, said sheet metal element formed with an integral socket having a threaded bore adapted to receive a threaded fastener therein, said threaded socket spaced a predetermined distance from said strap portion, said strap portion defined by a pair of longitudinally facing walls tapered downwardly from said inner surface to a planar base portion, each said base portion having parallel sides defining longitudinally extending upper and lower edges, said support panel member having an elongated oval-shaped impression raised from its upper surface, said support panel having a fastener receiving passage formed therein, said impression formed with a continuous peripheral tongue including opposed spaced upwardly inclined mirror image side tongue portions, said tongue portions having opposed vertically disposed parallel side faces defining an elongated slot therebetween, said slot sized to engage said strap portion therein such that with said sheet metal element lower surface contacting said tongue portions along their upper edges said stap base portion located a predetermined distance from a plane that includes said second panel member lower surface, such that each said strap base portion upper edge is positioned in intermediate opposed relation with its associated tongue portion side face, whereby upon said strap portion and said raised impression being flattened by ramming said sheet metal element lower surface and said support panel upper surface into flush abutment, said raised impression tongue portions when flattened decreasing the transverse dimension of said elongated slot such that each said tongue portion opposed side face slants inwardly in interlocking engagement with its associated strap base portion upper edge and sheet metal element lower surface thereby permanently interlocking said sheet metal element lower surface and said support panel upper surface in flush contact, such that said sheet metal element socket threaded bore is retained in alignment with said support panel fastener passage wherein said threaded bore is adapted to receive a threaded fastener therein after extension through said support panel passage, and wherein said sheet metal element upper surface and said sheet metal panel lower surface are uninterrupted by confining said displaced strap and tongue portions between parallel planes defined by said element upper surface and said panel lower surface.

4. The fastening arrangement as set forth in claim 3, wherein said sheet metal element having a pair of first and second elongated open loop strap portions pierced therefrom, said pair of strap portions spaced at a predetermined distance wherein the principal axis of said first strap portion is oriented at right angles to the principal longitudinal axis of said second strap portion, and said support panel having a pair of first and second impressions raised therefrom, said pair of raised impressions oriented in a predetermined manner such that said first raised impression defining an elongated slot sized to engage said first strap portion and said second raised impression defining an elongated slot sized to engage said second strap portion, whereby upon said pair of strap portions and their associated raised impressions being flattened as described in claim 8, said sheet metal element and said support panel being permanently interlocked at a single orientation.

* * * * *